(12) United States Patent
Xiao et al.

(10) Patent No.: US 11,297,230 B2
(45) Date of Patent: Apr. 5, 2022

(54) SHOOTING METHOD, DEVICE AND COMPUTER-READABLE STORAGE MEDIUM

(71) Applicant: SHENZHEN TRANSSION HOLDINGS CO., LTD., Shenzhen (CN)

(72) Inventors: Ming Xiao, Shenzhen (CN); Lingzhi Li, Shenzhen (CN); Haibin Wang, Shenzhen (CN); Yang Li, Shenzhen (CN)

(73) Assignee: SHENZHEN TRANSSION HOLDINGS CO., LTD., Shenzhen (CN)

( * ) Notice: Subject to any disclaimer, the term of this patent is extended or adjusted under 35 U.S.C. 154(b) by 0 days.

(21) Appl. No.: 17/044,224

(22) PCT Filed: Mar. 3, 2020

(86) PCT No.: PCT/CN2020/077663
§ 371 (c)(1),
(2) Date: May 6, 2021

(87) PCT Pub. No.: WO2021/077650
PCT Pub. Date: Apr. 29, 2021

(65) Prior Publication Data
US 2021/0258483 A1    Aug. 19, 2021

(51) Int. Cl.
*H04N 5/76* (2006.01)
*H04N 5/232* (2006.01)
(Continued)

(52) U.S. Cl.
CPC ....... *H04N 5/23238* (2013.01); *H04N 5/2258* (2013.01); *H04N 5/265* (2013.01)

(58) Field of Classification Search
None
See application file for complete search history.

(56) References Cited

U.S. PATENT DOCUMENTS

2014/0327758 A1* 11/2014 Hsiung ............... G02B 21/368
                                                          348/79
2015/0049188 A1*  2/2015 Harrell ................ F16M 11/38
                                                          348/139
2020/0296268 A1*  9/2020 Cutler .................. H04N 5/2258

FOREIGN PATENT DOCUMENTS

CN          101472119 A      7/2009
CN          103167227 A      6/2013
(Continued)

OTHER PUBLICATIONS

First Office Action in counterpart Chinese Application No. 201911016880.0, dated Jun. 1, 2020.
(Continued)

Primary Examiner — Eileen M Adams
(74) Attorney, Agent, or Firm — Westbridge IP LLC

(57) ABSTRACT

Disclosed is a shooting method, which is applied to a terminal device defining at least one camera, and the at least one camera includes at least one lift-able camera. The method includes: displaying a shooting interface; receiving a shooting instruction; controlling a first camera to shoot at least two images at different heights to obtain a shot photo, where the first camera is one of the at least one lift-able camera. With adoption of the embodiments of this application, the software debugging time for the camera can be reduced, and the shooting efficiency can be improved.

1 Claim, 5 Drawing Sheets

(51) Int. Cl.
*H04N 5/225* (2006.01)
*H04N 5/265* (2006.01)

(56) References Cited

FOREIGN PATENT DOCUMENTS

| | | | |
|---|---|---|---|
| CN | 103986872 | A | 8/2014 |
| CN | 108322644 | A | 7/2018 |
| CN | 108833621 | A | 11/2018 |
| CN | 105120179 | B | 1/2019 |
| CN | 109194875 | A | 1/2019 |
| CN | 109639975 | A | 4/2019 |
| CN | 109889709 | A | 6/2019 |
| CN | 110177217 | A | 8/2019 |
| CN | 110213414 | A | 9/2019 |
| CN | 110278366 | A | 9/2019 |
| CN | 110740260 | A | 1/2020 |
| EP | 2819386 | A1 | 12/2014 |
| JP | 2002122425 | A | 4/2002 |

OTHER PUBLICATIONS

International Search Report in corresponding PCT Application No. PCT/CN2020/077663, dated Jul. 22, 2020.
Written Opinion in corresponding PCT Application No. PCT/CN2020/077663, dated Jul. 22, 2020.
Refusal Decision in counterpart Chinese Application No. 201911016880.0, dated Apr. 6, 2021.
Second Office Action in counterpart Chinese Application No. 201911016880.0, dated Aug. 24, 2020.
Supplementary European Search Report in counterpart European Patent Application No. 20803433.0, dated Jun. 22, 2021.
Third Office Action in counterpart Chinese Application No. 201911016880.0, dated Nov. 11, 2020.

* cited by examiner

SHOOTING METHOD, DEVICE AND COMPUTER-READABLE STORAGE MEDIUM

CROSS REFERENCE TO RELATED APPLICATIONS

This application is the National Stage of International Application No. PCT/CN2020/077663, filed on Mar. 3, 2020, which claims the benefit of Chinese Patent application No. 201911016880.0, filed on Oct. 24, 2019, applied by SHENZHEN TRANSSION HOLDINGS CO., LTD. and entitled "Shooting Method, Device and Computer Readable Storage Medium", the entirety of which is hereby incorporated herein by reference.

FIELD

This application relates to the technical field of smart terminals, and particularly to a shooting method, device, and computer-readable storage medium.

BACKGROUND

With the development of terminal technology, the penetration rate of mobile terminals is getting higher and higher, and the shooting capabilities of mobile terminals have become the focus of consumers. Nowadays, mobile terminals with single rear cameras can meet the daily shooting needs of consumers. However, in some scenes, when a photo that highlights the subject and blurs out other framing objects is needed to be shot, it can only be achieved by shooting by a camera with large aperture at a right distance. However, in mobile terminals, limited by the specifications and technological level of the camera, a camera that fully meets the requirements can not be produced.

At present, the industry has proposed the use of array cameras (usually dual rear cameras) to solve the above problems. Two cameras can shoot multiple images of the same scene at different angles at the same time, and the image subject and depth of field information can be acquired separately from the multiple images, thereby blurring the background to get a blurry photo. In this way, the software debugging time for the camera will be increased, which makes the shooting efficiency low.

SUMMARY

The embodiments of this application provide a shooting method and a shooting device, which can shoot multiple photos at different positions through at least one lift-able camera, so as to reduce the software debugging time of the cameras and improve the shooting efficiency.

In a first aspect, this application provides a shooting method, applied to a terminal device provided with at least one camera, and the at least one camera includes at least one lift-able camera, where the method includes:

displaying a shooting interface;

receiving a shooting instruction; and controlling a first camera to shoot at least two images at different heights to obtain a shot photo, where the first camera is one of the at least one lift-able camera.

In a possible implementation, before receiving a shooting instruction, the method further includes:

in response to detecting a selection instruction for selecting a first shooting mode, switching a shooting mode from a current shooting mode to the first shooting mode.

In a possible implementation, controlling a first camera to shoot at least two images at different heights to obtain a shot photo includes:

controlling the first camera to shoot a first image at a first height;

controlling the first camera to shoot a second image at a second height, where the first height and the second height are two different heights in height information; and performing fusion processing on the first image and the second image to obtain the shot photo.

In a possible implementation, the height information further includes an orientation of the terminal device, and the method further includes:

acquiring the orientation of the terminal device, where the orientation is a vertical orientation or a horizontal orientation; and in a determination that an orientation in height information corresponding to the first shooting mode is different from the orientation acquired, promoting information for prompting to adjust the orientation of the terminal device.

In a possible implementation, before controlling the first camera to shoot a first image at a first height, the method further includes:

acquiring height information corresponding to the first shooting mode according to a correspondence between the shooting mode and the height information; and determining whether the height information includes two or more heights.

In a possible implementation, subsequent to acquiring height information corresponding to the first shooting mode according to a correspondence between the shooting mode and the height information, the method further includes:

determining whether the first shooting mode corresponds to two or more height information;

in a determination that the first shooting mode corresponds to two or more height information, displaying the two or more height information on the shooting interface; and in response to detecting a selection operation of a first height information in the two or more height information, determining the first height information as height information of the first shooting mode.

In a possible implementation, controlling a first camera to shoot at least two images at different heights to obtain a shot photo further includes:

in a determination that the height information does not include two or more heights, moving the first camera to a third height, where the third height is a height of a camera set in the height information;

shooting images under different exposure parameters at the third height to obtain at least two images; and performing fusion processing on the at least two images obtained to obtain the shot photo.

In a possible implementation, subsequent to moving the first camera to a third height, the method further includes:

in response to detecting an adjustment instruction for adjusting a height of the first camera, displaying an adjustable range; and in response to detecting an operation for the adjustable range, adjusting the first camera to a height corresponding to the operation.

In a possible implementation, subsequent to displaying an adjustable range, the method further includes:

promoting information for prompting whether to confirm the operation for the adjustable range; and detecting an operation for confirmation of the operation for the adjustable range input for the information.

In a possible implementation, subsequent to moving the first camera to a third height, the method further includes:

in response to detecting an adjustment instruction for adjusting a height of the first camera, displaying an adjustable range; and in response to detecting dragging of the first camera, displaying a height of the first camera being dragged within the adjustable range.

In a possible implementation, the method further includes:

during shooting by the first camera, promoting information for prompting the terminal device cannot be moved.

In a possible implementation, the first shooting mode is a blur shooting mode, and the method further includes: obtaining subject information and depth information from the first image and the second image; and performing fusion processing on the first image and the second image to synthesize a blurred photo.

In a second aspect, the embodiment of this application provide a shooting method, which is applied to a terminal device provided with two or more cameras, and the two or more cameras includes at least one lift-able camera, where the method includes:

displaying a shooting interface;

receiving a shooting instruction; and controlling a second camera to shoot at different heights and a third camera to shoot at different heights to obtain a shot photo, where at least one of the second camera and the third camera is a lift-able camera.

In a possible implementation, the second camera is a fixed camera, and the third camera is the lift-able camera, after receiving the shooting instruction, the method further comprises:

controlling the third camera to be extended to a maximum height, then be retracted therefrom towards the terminal device, and continuously shoot panoramic images during retraction;

performing fusion processing on the panoramic images shot by the third camera and an image shot by the second camera to obtain a panoramic photo.

In a possible implementation, during fusion process, the image shot by the second cameras is taken as a central axis of the panoramic photo.

In a possible implementation, controlling a second camera to shoot at different heights and a third camera to shoot at different heights to obtain a shot photo includes:

acquiring height information corresponding to a second shooting mode according to a correspondence between a shooting mode and height information;

acquiring first height information corresponding to the second camera and second height information corresponding to the third camera according to the second shooting mode; and determining whether the first height information and the second height information both include two or more heights.

In a possible implementation, in a determination that the first height information and the second height information both include two or more heights, the method further includes: controlling the second camera to shoot a first image at a third height, and controlling the third camera to shoot a second image at a fourth height;

controlling the second camera to shoot a third image at a fifth height, and controlling the third camera to shoot a fourth image at a sixth height, where the third height and the fifth height are two different heights in the first height information, and the fourth height and the sixth height are two different heights in the second height information; and performing fusion processing on the first image, the second image, the third image, and the fourth image to obtain the shot photo.

In a third aspect, the embodiment of this application provide a shooting method, applied to a terminal device provided with at least one camera, and the at least one camera includes at least one lift-able camera, where the method includes:

displaying a shooting interface;

receiving a shooting instruction; and controlling a lift-able camera to extend to a maximum height and then retract therefrom towards the terminal device, continuously shooting panoramic images during retraction.

In a possible implementation, the terminal device further includes a fixed camera in addition to the at least one lift-able camera; and the method further comprises:

in response to receiving an automatic panoramic shooting instruction, controlling the fixed camera to shoot and output a fixed image, controlling the at least one lift-able camera to output a panoramic image, and performing fusion processing on the fixed image and the panoramic image to obtain a panoramic photo.

In a fourth aspect, the embodiment of this application provide a mobile terminal, the mobile terminal is provided with at least one lift-able camera, and the at least one lift-able camera is moved reciprocally along a first direction for shooting at a first position in the first direction and a second position in the first direction respectively.

In a possible implementation, the at least one lift-able camera is extended beyond a housing of the mobile terminal along the first direction for shooting at the first position extended beyond the housing in the first direction and the second position extended beyond the housing in the first direction respectively to obtain a shot photo.

In a possible implementation, in a determination that the at least one lift-able camera is at any position outside the housing and a pushing operation on the at least one lift-able camera is received, the at least one lift-able camera is retracted into the housing of the mobile terminal.

In a possible implementation, in response to receiving a drag operation of a user for one of the at least one lift-able camera, a dragged camera is moved to a position the drag operation being located.

In a fifth aspect, the embodiment of this application provides a shooting device, including:

a first display unit, configured to display a shooting interface;

a receiving unit, configured to receive a shooting instruction;

a control unit, configured to control a first camera to shoot at least two images at different heights to obtain a shot photo, where the first camera is one of the at least one lift-able camera.

In a possible implementation, the device further includes:

a switching unit, configured to switch a shooting mode from a current shooting mode to a first shooting mode in response to detecting a selection instruction for selecting the first shooting mode.

In a possible implementation, the control unit is specifically configured to:

control the first camera to shoot a first image at a first height;

control the first camera to shoot a second image at a second height, where the first height and the second height are two different heights in height information; and perform fusion processing on the first image and the second image to obtain the shot photo.

In a possible implementation, the height information further includes an orientation of the terminal device, and the device further includes:

a first acquisition unit, configured to acquire the orientation of the terminal device, where the orientation is a vertical orientation or a horizontal orientation; and a first output unit, configured to promote information for prompting to adjust the orientation of the terminal device in a determination that an orientation in height information corresponding to the first shooting mode is different from the orientation acquired.

In a possible implementation, the device further includes:

a second acquisition unit, configured to acquire height information corresponding to the first shooting mode according to a correspondence between the shooting mode and the height information; and a first determination unit, configured to determine whether the height information includes two or more heights.

In a possible implementation, the device further includes:

a second determination unit, configured to determine whether the first shooting mode corresponds to two or more height information;

a second display unit, configured to display the two or more height information on the shooting interface in a determination that the first shooting mode corresponds to two or more height information; and a determination unit, configured to determine the first height information as height information of the first shooting mode in response to detecting a selection operation of a first height information in the two or more height information.

In a possible implementation, the control unit is further configured to:

in a determination that the height information does not include two or more heights, move the first camera to a third height, where the third height is a height of a camera set in the height information;

shoot images under different exposure parameters at the third height to obtain at least two images; and perform fusion processing on the at least two images obtained to obtain the shot photo.

In a possible implementation, the device further includes:

a third display unit, configured to display an adjustable range in response to detecting an adjustment instruction for adjusting a height of the first camera; and an adjustment unit, configured to adjust the first camera to a height corresponding to the operation in response to detecting an operation for the adjustable range.

In a possible implementation, the device further includes:

a second output unit, configured to promote information for prompting whether to confirm the operation for the adjustable range; and a detection unit, configured to detect an operation for confirmation of the operation for the adjustable range input for the promote information.

In a possible implementation, the device further includes:

a fourth display unit, configured to display an adjustable range in response to detecting an adjustment instruction for adjusting a height of the first camera; and a fifth display unit, configured to display a height of the first camera being dragged within the adjustable range in response to detecting dragging of the first camera.

In a possible implementation, the device further includes:

a third output unit, configured to promote information for prompting the terminal device cannot be moved during shooting by the first camera.

In a possible implementation, the first shooting mode is a blur shooting mode, and the method further includes: obtaining subject information and depth information from the first image and the second image; and performing fusion processing on the first image and the second image to synthesize a blurred photo.

In a sixth aspect, embodiment of this application provides a shooting device, including:

a display unit, configured to display a shooting interface;

a receiving unit, configured to receive a shooting instruction; and a control unit, configured to control a second camera to shoot at different heights and a third camera to shoot at different heights to obtain a shot photo, where at least one of the second camera and the third camera is a lift-able camera.

In a possible implementation, the device further includes:

a shooting unit, configured to shoot panoramic images continuously during retraction when the third camera is extended to a to a maximum height and then be retracted therefrom towards the terminal device;

a fusion unit, configured to perform fusion processing on the panoramic images shot by the third camera and an image shot by the second camera to realize a panoramic shooting function.

In a possible implementation, during fusion process, the image shot by the second camera is taken as a central axis of the panoramic photo.

In a possible implementation, the control unit is specifically configured to:

acquire height information corresponding to a second shooting mode according to a correspondence between a shooting mode and height information;

acquire first height information corresponding to the second camera and second height information corresponding to the third camera according to the second shooting mode; and determine whether the first height information and the second height information both include two or more heights.

In a possible implementation, the control unit is further configured to:

in a determination that the first height information and the second height information both include two or more heights, control the second camera to shoot a first image at a third height, and control the third camera to shoot a second image at a fourth height;

control the second camera to shoot a third image at a fifth height, and control the third camera to shoot a fourth image at a sixth height, where the third height and the fifth height are two different heights in the first height information, and the fourth height and the sixth height are two different heights in the second height information; and perform fusion processing on the first image, the second image, the third image, and the fourth image to obtain the shot photo.

In a seventh aspect, this application provides a shooting device, including:

a display unit, configured to display a shooting interface;

a receiving unit, configured to receive a shooting instruction; and a control unit, configured to control the at least one lift-able camera to be extended to a maximum height and then be retracted therefrom towards the terminal device, continuously shooting panoramic images during retraction.

In a possible implementation, the terminal device further includes a fixed camera in addition to the at least one lift-able camera; and the control unit is configured to control the fixed camera to shoot and output a fixed image, control the at least one lift-able camera to output a panoramic image, and perform fusion processing on the fixed image and the panoramic image to obtain a panoramic photo, in response to receiving an automatic panoramic shooting instruction.

In a seventh aspect, the embodiment of this application provides a terminal device, which includes a processor, a memory, an input device, an output device, and a camera, and the processor, the memory, the input device, the output device and the camera are connected to each other. The memory is configured to store a computer program supporting the terminal device to execute the above process identification method, the computer program includes program instructions, and the processor is configured to invoke the program instructions to execute the method provided by the foregoing first aspect or any implementation of the foregoing first aspect.

In an eighth aspect, the embodiment of this application provides a terminal device, which includes a processor, a memory, an input device, an output device, and a camera, and the processor, the memory, the input device, the output device and the camera are connected to each other. The memory is configured to store a computer program supporting the terminal device to execute the above process identification method, the computer program includes program instructions, and the processor is configured to invoke the program instructions to execute the method provided by the foregoing second aspect or any implementation of the foregoing second aspect.

In a ninth aspect, the embodiment of this application provides a terminal device, which includes a processor, a memory, an input device, an output device, and a camera, and the processor, the memory, the input device, the output device and the camera are connected to each other. The memory is configured to store a computer program supporting the terminal device to execute the above process identification method, the computer program includes program instructions, and the processor is configured to invoke the program instructions to execute the method provided by the foregoing third aspect or any implementation of the foregoing third aspect.

In a tenth aspect, the embodiment of this application provides a computer-readable storage medium. The computer-readable storage medium stores a computer program, and the computer program includes program instructions that, when executed by a processor, cause the processor to execute the method provided by the foregoing first aspect and/or any implementation of the foregoing first aspect, the foregoing second aspect and/or any implementation of the foregoing second aspect, the foregoing third aspect and/or any implementation of the foregoing third aspect.

The embodiment of this application are applied to a terminal device provided with at least one lift-able camera in at least one camera. A shooting interface is displayed and a shooting instruction is received, so that the at least one lift-able camera may shoot multiple images at different heights, the terminal device processes the obtained multiple images, takes the processed result as a shot photo, and outputs the shot photo. The method of controlling the at least one lift-able camera to replace shooting by multiple cameras may not only reduce the occupation of the interface from the hardware, but also simplify the circuit structure of the terminal device, thereby reducing the debugging time on the software and improving the shooting efficiency.

BRIEF DESCRIPTION OF THE DRAWINGS

In order to more clearly describe the technical solutions in the embodiments of this application, the following will briefly introduce the drawings that need to be used in the description of the embodiments. Obviously, the drawings in the following description are only some embodiments of this application. For those of ordinary skill in the art, without creative work, other drawings can be obtained according to these drawings.

DETAILED DESCRIPTION OF THE EMBODIMENTS

The technical solutions in the embodiments of this application will be described clearly and completely in conjunction with the drawings in the embodiments of this application.

It should be understood that when used in this specification and the appended claims, the terms "comprise" and "include" indicate the existence of the described features, wholes, steps, operations, elements and/or components, but do not exclude the existence or addition of at least one other features, wholes, steps, operations, elements, components, and/or collections thereof.

It should also be understood that the terms used in the specification of this application are only for the purpose of describing specific embodiments and are not intended to limit the application. As used in the specification of this application and the appended claims, unless the context clearly indicates other circumstances, the singular forms "a", "an" and "the" are intended to include plural forms.

It should be further understood that the term "and/or" used in the specification and appended claims of this application refers to any combination of at least one of the items listed in the associated and all possible combinations, and includes these combinations.

As used in this specification and the appended claims, the term "if" can be interpreted as "when" or "once" or "in response to determination" or "in response to detection" depending on the context. Similarly, the phrase "if determined" or "if detected [described condition or event]" can be interpreted as meaning "once determined" or "in response to determination" or "once detected [described condition or event]" or "in response to detection of [condition or event described]" depending on the context.

Figure 1:
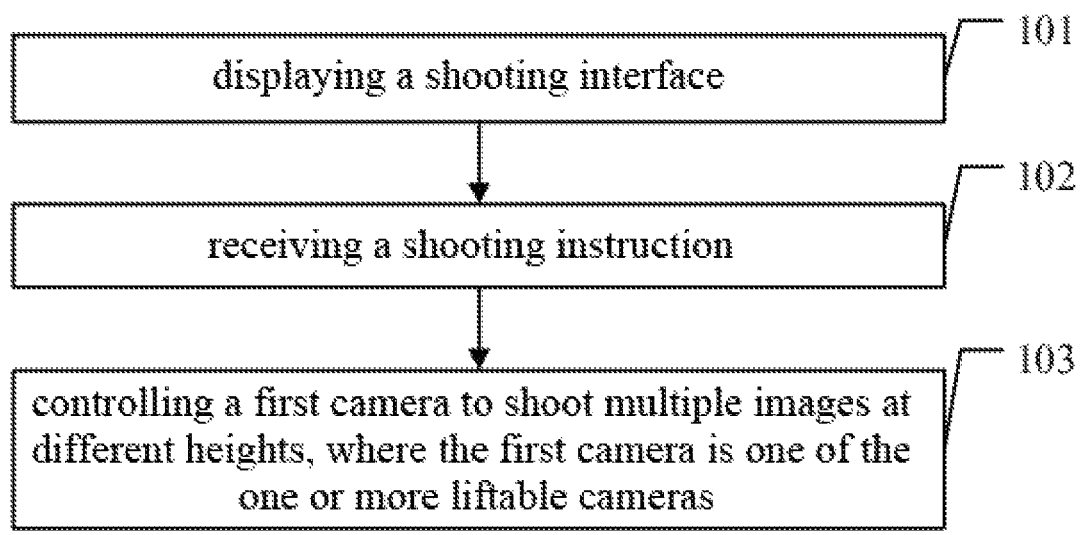
FIG. 1 is a schematic flowchart of a shooting method according to an embodiment of this application.

Please refer to FIG. 1. FIG. 1 is a schematic flowchart of a shooting method according to an embodiment of this application. Where, the method is applied to a terminal device provided with at least one camera, and the at least one camera includes at least one lift-able camera. As shown in FIG. 1, the shooting method may include:

101. displaying a shooting interface.

In a possible implementation, the terminal device in the embodiments of this application may include mobile phones, tablet computers, Personal Digital Assistants (PDA), Mobile Internet Devices (MID), smart wearable devices (such as smart watches, smart bracelets) and other electronic devices that can integrate multiple cameras.

Where, the terminal device may be provided with at least one camera, and one lift-able camera may be provided on one side of the terminal device. Where, the lift-able camera is in a default position when it is not in use. The default position is a position where the lift-able camera is located when no shooting software is started, and it may be the lowest position the lift-able camera can be lowered.

The terminal device may display a shooting interface after entering a camera software, and a camera may be moved to a start position. That is, the start position is different from the aforementioned default position, which is the position where the camera is ready to shoot, and the position is the lowest point the camera can be lifted during the shooting. In the shooting interface of the terminal device, a shooting button, at least one shooting modes, at least one exposure parameter modes, a flash on button, etc. may be displayed. There is no limitation on the content displayed in the shooting interface. Specifically, the shooting modes include a blur shooting mode, a 3D shooting mode, a landscape shooting mode, a portrait shooting mode, a night scene mode and so on. When a shooting instruction input by a user is received, if the user does not switch the shooting mode, the shooting will be performed in a current shooting mode of the camera.

In response to detecting a selection instruction input by the user for selecting a first shooting mode, the shooting mode is switched from the current shooting mode to the first shooting mode, where the first shooting mode is any shooting mode selected by the user other than the current shooting mode.

102. receiving a shooting instruction.

In a possible implementation, receiving a shooting instruction input by the user may be performed by clicking the shooting button in the shooting interface to shoot, or may be performed by shooting immediately when a specific expression or action of a person is detected in the shooting interface, or may be performed by time-lapse shooting such as setting a certain time in advance by the user to automatically turn on the camera for shooting, or may be performed by shooting according to a shooting instruction input by the user's voice, etc. The method of inputting the shooting instruction is not limited.

103. controlling a first camera to shoot multiple images at different heights, where the first camera is one of the at least one lift-able camera.

In a possible implementation, the shooting device controls the at least one lift-able camera to shoot multiple images at different heights. Specifically, after the user selects the shooting mode, the terminal device may acquire height information of shooting of the camera according to the shooting mode, which may include one height or multiple heights. If the shooting mode corresponds to multiple heights, the camera may be moved from the start position to positions of the multiple heights to shoot multiple images respectively. If the height information only includes one height, the camera may be moved to the height in the height information to shoot multiple images to obtain the shot photo.

Where, one shooting mode may correspond to multiple height information. When the user selects the current shooting mode, the height information of shooting of the camera is acquired. The height information may include an orientation information of the terminal device, and the orientation information refers to shooting orientation of the terminal device, which includes horizontal shooting and vertical shooting.

When it is determined that the current shooting mode corresponds to multiple height information, the multiple height information is displayed on the shooting interface, and a camera movement demonstration diagram during shooting may be displayed, or a shooting effect diagram may be displayed, which is not limited here. After displaying the multiple height information, the user is prompted to select one height information from the multiple height information as the height information corresponding to the current shooting mode.

After the height information is determined, a current orientation of the terminal device is acquired. The orientation of the terminal device may be acquired by a gravity sensor to determine whether the terminal device is currently in a vertical or horizontal orientation, that is, whether the terminal device is in a horizontal or vertical screen state. In a determination that an orientation required in the height information corresponding to the current shooting mode is different from the acquired orientation, information for prompting the user to adjust the orientation of the terminal device is output.

After a certain interval, the orientation of the terminal device is acquired again. If the orientation of the terminal device acquired again is consistent with the orientation in the height information corresponding to the current shooting mode, no information will be displayed on the display interface, and the user's shooting instruction is waited to be received.

Optionally, after a certain interval, the orientation of the terminal device is acquired again, and if the orientation detected again is inconsistent with the orientation in the height information, information is continuously output. If it is not detected within a preset time range that the orientation of the terminal device is consistent with the orientation in the height information corresponding to the current shooting mode, it is determined that the terminal device is currently unmanned, and the camera and display screen of the current terminal device may be put to sleep.

Where, in the process of shooting, it is inevitable that if the height information corresponding to the current shooting mode includes multiple heights, it takes a certain time for the camera to be moved from the start position to the multiple heights in the height information. In order to get a better shooting effect, the terminal device needs to stay still while the camera is moving and shooting. Therefore, in the process of shooting of the camera, information is output to prompt the user that the terminal device cannot be moved. The output mode may be output in the form of text in the display interface, or output in the form of voice broadcast, or output in the form of flashing light to prompt the user, the way of promoting information is not limited here.

In a possible implementation, after obtaining multiple images, the obtained images are subjected to fusion processing into one photo, which is taken as the shot photo. The fusion processing of the multiple images is divided into two categories, one is a fusion processing of the multiple images with different exposure parameters shot by the camera at the same position, and the other is a fusion processing of the multiple images shot by the camera at different positions, where the camera may shoot the multiple images at different heights for two-step fusion processing, the first step is to perform fusion processing on multiple images at each height into one image, and the second step is to perform fusion processing again on images of different heights, and the final result of multiple images processing is an image that is taken as the shot photo.

Specifically, the multiple images with different exposure parameters shot by the camera at the same position may be two images with a lower exposure parameter and a higher exposure parameter. When the two images are fused, a subject under lower exposure and a background under higher exposure may be fused, and a background under higher exposure and a subject under lower exposure may also be fused, which is not limited here.

In a possible implementation, the camera shoots multiple images at the same position may be performed by moving the camera to the height corresponding to the shooting mode for shooting after receiving the shooting instruction, or may be performed by moving the camera to the height corresponding to the current shooting mode, and shooting when the shooting instruction input by the user is received.

Specifically, if it is determined by the user that the camera cannot obtain a desired shooting effect at the preset position, and the camera needs to be moved to not at the preset shooting height, an adjustment instruction may be manually input, so that the terminal device may display an adjustable range, where the adjustable range refers to a maximum range that the camera may be adjusted. The adjustable range may be several fixed heights or a sliding range of heights, which is not limited here. When a user operation for the adjustable range is detected, the camera will be adjusted to a height corresponding to the user operation. Before adjusting the height of the camera, when the user selects the height to be adjusted, information may be output to the user to prompt the user whether to confirm the operation of the adjustable range, for example, information "Whether to adjust the camera to the H1 position?" may be output to the user. When the user's confirmation operation for the information input is detected, the camera is adjusted to the height selected by the user.

Where, adjustment of the height of the camera may be performed by selecting a height that the user needs to adjust from the adjustable range displayed on the display screen, or may be performed by an operation of manually dragging the camera. That is, when the adjustment instruction input by the user is detected, the adjustable range is displayed. When a dragging operation on the camera is detected, a height of the camera is acquired, and the height is displayed within the adjustable range of the current interface.

Specifically, for the multiple images shot by the camera at multiple positions, first, two images with different exposure parameters may be shot at each position, and the two images may be synthesized to obtain one image at each height. Different image information may be acquired from images of different heights according to needs, and the fusion processing is performed to obtain the shot photo.

Optionally, when the images are subjected to fusion processing, the saturation, brightness, hue and other parameters of the images may be processed, which is not limited here.

In a possible implementation, the processed photo is stored and output to the display screen, where the final processing result is stored in the terminal device, and the multiple shot images may be deleted to release the memory of the terminal device.

For example, if the current shooting mode of the terminal device is a normal shooting mode, in response to detecting a selection instruction input by the user for selecting the first shooting mode, that is, a blur shooting mode, the normal shooting mode is switched to the blur shooting mode. The height information corresponding to the blur shooting mode is acquired according to a correspondence between the shooting mode and the height information. That is, the camera needs to shoot multiple images at the heights of H1 and H2 respectively to obtain subject information and depth information in the images, so as to synthesize one blurred photo similar to a blurred photo shot by a single lens reflex camera with a large aperture. In response to detecting a selection instruction input by the user for selecting a second shooting mode, that is, a 3D shooting mode, the normal shooting mode is switched to the 3D shooting mode, and the terminal device acquires the height information corresponding to the 3D shooting according to a correspondence between the shooting mode and the height information. It can be understood that when multiple images are obtained separately, the fusion processing of blurred images and the fusion processing of 3D images are performed separately to obtain the blurred image and the 3D image.

Optionally, information for prompting the user of the shooting mode of the current terminal device may be output on the shooting interface.

In a possible implementation, the height information may be the height information corresponding to the shooting mode stored in the factory settings of the terminal device. For example, during research and development, people find that the camera of the terminal device has a better effect of shooting people at the position of H3 and has a better effect of shooting scenery at the position of H4. Therefore, the height information of H3 is correlated with the portrait shooting mode, and the height information of H4 is correlated with the landscape shooting mode. It can be understood that the above are only examples, and this application includes but is not limited to the aforementioned shooting modes. The terminal device determines whether the height information includes multiple heights, and in a determination that the height information includes multiple heights, the camera is controlled to shoot a first image at a first height and shoot a second image at a second height, where the first height and the second height are two different heights in the height information. The first image and the second image are determined as multiple shot images, and after the multiple images are obtained, the multiple images are subjected to fusion processing to obtain a photo in the current shooting mode.

In a possible implementation, the camera shoots multiple images at different heights. The camera is first moved to a first height in the height information in order to shoot an image, where the first height is different from the default position and the start position of the camera and is a first shooting height according to a preset shooting process. The order of movement may be from highest to lowest, or may be from lowest to highest, which is not limited here.

During the shooting process of the camera, the information for prompting the user that the terminal device cannot be moved is output, and the output method is not limited here.

Optionally, during the shooting process, a reference line may be displayed in the shooting interface of the terminal device to prompt the user to determine whether the terminal device has been moved.

In a possible implementation, after shooting at a first height, the camera is moved to a second height, where the first height and the second height are two different heights. After being moved to the second height for shooting images, the camera may be moved to a third height and a fourth height for shooting images, which is not limited here.

The embodiments of this application are applied to a terminal device provided with at least one lift-able camera in at least one camera. A shooting interface is displayed and a shooting instruction input by the user is received, so that the at least one lift-able camera may shoot multiple images at different heights. The terminal device processes the obtained multiple images, takes the processed result as a shot photo, and outputs the shot photo. The method of controlling the lift-able camera to replace shooting by multiple cameras may not only reduce the occupation of the interface from the hardware, but also simplify the circuit structure of the terminal device, thereby reducing the debugging time on the software and improving the shooting efficiency.

Figure 2:
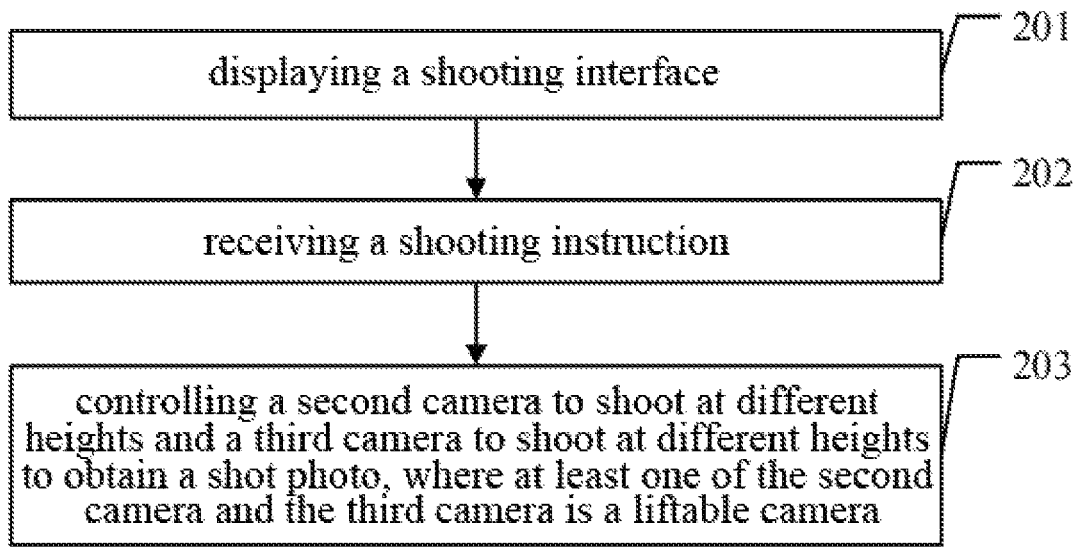
FIG. 2 is a schematic flowchart of another shooting method according to an embodiment of this application.

Please refer to FIG. 2. FIG. 2 is a schematic flowchart of another shooting method according to an embodiment of this application. Where, the method is applied to a terminal device provided with two or more cameras, and the two or more cameras includes at least one lift-able camera. As shown in FIG. 2, the shooting method may include:

201. displaying a shooting interface.

202. receiving a shooting instruction.

For the specific implementation process of Step 201 to Step 202, refer to the description of Step 101 to Step 102 in the embodiments corresponding to FIG. 1, and the details will not be repeated here.

203. controlling a second camera to shoot at different heights and a third camera to shoot at different heights to obtain a shot photo, where at least one of the second camera and the third camera is a lift-able camera.

In a possible implementation, the lift-able camera may arrange at least one lift-able camera. When at least one camera is included, height information corresponding to a current shooting mode is acquired. One camera may correspond to one height information, and one shooting mode may also correspond to multiple height information. After the shooting mode is selected by the user, the height information of the camera may be selected. It can be understood that each camera corresponds to one height information.

Take two lift-able cameras as an example here, that is, a second camera and a third camera. It is respectively determined whether height information corresponding to the two cameras both include multiple heights. In a determination that the height information corresponding to the two cameras both include multiple heights, the two cameras are controlled to shoot according to heights in the height information respectively, that is, the second camera and the third camera respectively shoots according to the corresponding height information to obtain multiple images. Take the height information of each camera includes two heights as an example, four images are obtained for fusion processing to obtain one photo for output. Here, a number of lift-able cameras is not limited, and a number of heights in the height information is also not limited. Where, the height information corresponding to the second camera may be the same as or different from the height information corresponding to the third camera, which is not limited here.

In a possible implementation, take two cameras as an example. If one of the second camera and the third camera is a lift-able camera, and the other one of the second camera and the third camera is a fixed camera, height information of the two cameras in the current shooting mode is acquired respectively. Where, the height information of the fixed camera is a fixed height, and images under different exposure parameters may be shot, or one image may be shot, and may be fused with images shot at different heights by another lift-able camera to obtain the shot photo.

For example, the second camera is a fixed camera, and the third camera is a lift-able camera. When the current shooting mode is a panoramic shooting mode, after receiving the shooting instruction input by the user, the third camera may be extended to a maximum height and then be retracted therefrom towards the terminal device, continuously shooting panoramic images during retraction. And, the second camera may shoot a photo at a fixed position. It should be noted that, after obtaining multiple images, when performing fusion processing, the panoramic images shot by the third camera and an image shot by the second camera are subjected to fusion processing to realize a panoramic shooting function. Where, the terminal device may shoot vertically, and the terminal device may also shoot horizontally. In the fusion process, the image shot by the second camera (i.e., the fixed camera) may be fused with the panoramic images as a center position, or the image shot by the second camera may be taken as a start or end position image for fusion to obtain a panoramic photo.

The embodiments of this application are applied to a terminal device provided with at least one lift-able camera in at least one camera. A shooting instruction input by the user is received, so that at least one lift-able camera may shoot multiple images separately for fusion processing to obtain a shot photo, and depth of field information may be acquired from the multiple images, so that better shooting effects may be obtained.

The embodiments of this application are applied to a terminal device provided with at least one lift-able camera in at least one camera. A shooting interface is displayed and a shooting instruction input by the user is received, so that the at least one lift-able camera may shoot multiple images at different heights. The terminal device processes the obtained multiple images, takes the processed result as a shot photo, and outputs the shot photo. The method of controlling the lift-able camera to replace shooting by multiple cameras may not only reduce the occupation of the interface from the hardware, but also simplify the circuit structure of the terminal device, thereby reducing the debugging time on the software and improving the shooting efficiency.

Figure 3:
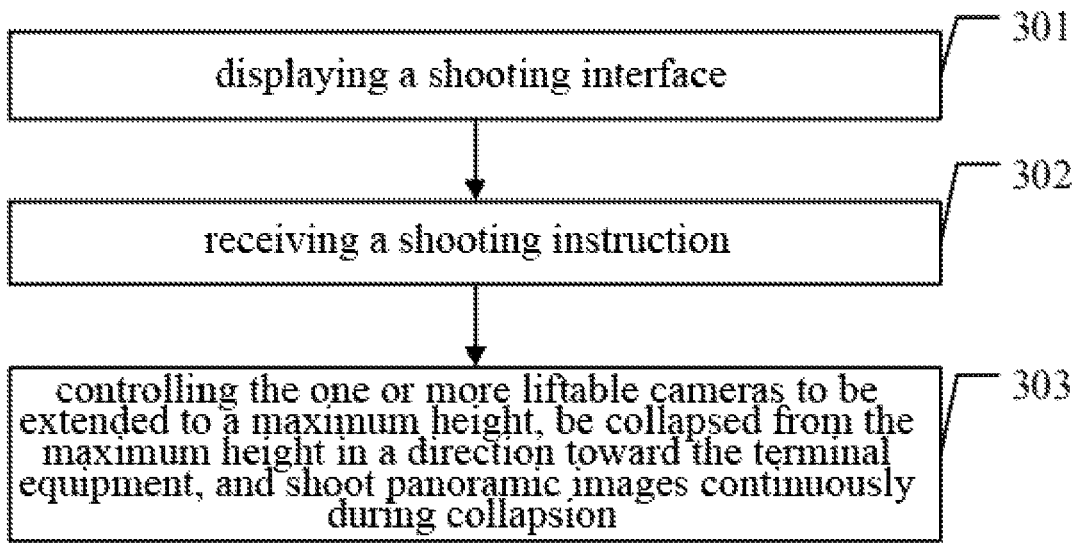
FIG. 3 is a schematic flowchart of still another shooting method according to an embodiment of this application.

Please refer to FIG. 3. FIG. 3 is a schematic flowchart of still another shooting method of this application. Where, the method is applied to a terminal device provided with at least one camera, and the at least one camera includes at least one lift-able camera. As shown in FIG. 2, the shooting method may include:

301. displaying a shooting interface.

302. receiving a shooting instruction.

For the specific implementation process of Step 301 to Step 302, refer to the description of Step 101 to Step 102 in the embodiments corresponding to FIG. 1, and the details will not be repeated here.

303. controlling the at least one lift-able camera to be extended to a maximum height, then be retracted therefrom towards the terminal device, and continuously shoot panoramic images during retraction.

In a possible implementation, if the shooting mode is set to the panoramic mode during the shooting process, after receiving the shooting instruction input by the user, the lift-able camera may be extended to a maximum height and then be retracted therefrom towards the terminal device, continuously shooting panoramic images during retraction. Or, after receiving the shooting instruction input by the user, the lift-able camera may be continuously raised from the lowest height to the maximum height and shoot panoramic images continuously during the movement. The user may also select the start height and the end height. After receiving the shooting instruction, the camera may move from the start height to the end height selected by the user and shoot continuously during the movement.

Where, in the panoramic mode, only one camera may be controlled, that is, the lift-able camera, or two cameras may be controlled, and the second camera is a fixed camera. When receiving the shooting instruction input by the user, the lift-able camera shifts and shoots, and the fixed camera shoots a fixed image. The fixed image is fused with the images shot by the lift-able camera to obtain a panoramic photo.

The embodiments of this application are applied to a terminal device provided with at least one lift-able camera in at least one camera. By displaying a shooting interface and receiving a shooting instruction input by the user, the at least one lift-able camera may shoot multiple images at different heights. The terminal device processes the obtained multiple images, takes the processed result as a shot photo, and outputs the shot photo. The method of controlling the lift-able camera to replace shooting by multiple cameras may not only reduce the occupation of the interface from the hardware, but also simplify the circuit structure of the terminal device, thereby reducing the debugging time on the software and improving the shooting efficiency.

Figure 4:
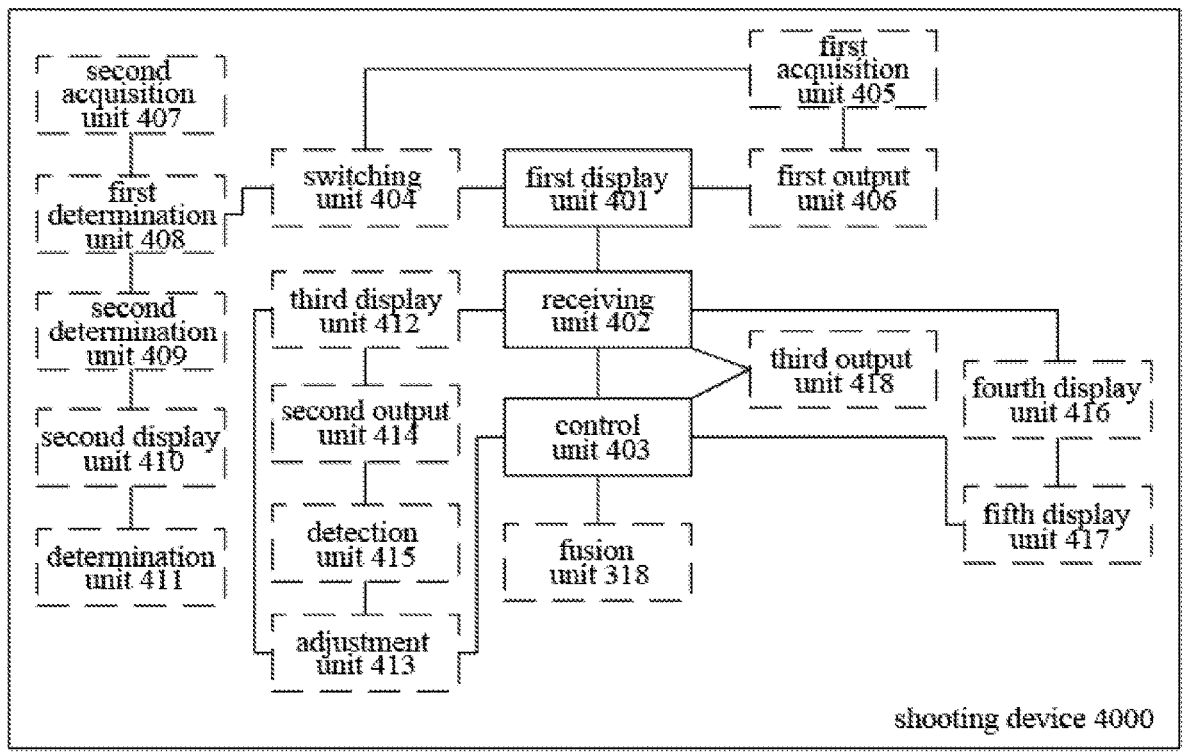
FIG. 4 is a schematic structural diagram of a shooting device according to an embodiment of this application.

Please refer to FIG. 4. FIG. 4 is a schematic flowchart of a shooting device of this application. As shown in FIG. 4, the shooting device 4000 may include:

a first display unit 401, configured to display a shooting interface;

a receiving unit 402, configured to receive a shooting instruction;

a control unit 403, configured to control a first camera to shoot at least two images at different heights to obtain a shot photo, where the first camera is one of the at least one lift-able camera.

In a possible implementation, the device 4000 further includes:

a switching unit 404, configured to switch a shooting mode from a current shooting mode to a first shooting mode in response to detecting a selection instruction for selecting the first shooting mode.

In a possible implementation, the control unit 403 is specifically configured to:

control the first camera to shoot a first image at a first height;

control the first camera to shoot a second image at a second height, where the first height and the second height are two different heights in height information; and perform fusion processing on the first image and the second image to obtain the shot photo.

In a possible implementation, the height information further includes an orientation of the terminal device, and the device 4000 further includes:

a first acquisition unit 405, configured to acquire the orientation of the terminal device, where the orientation is a vertical orientation or a horizontal orientation; and a first output unit 406, configured to promote information for prompting to adjust the orientation of the terminal device in a determination that an orientation in height information corresponding to the first shooting mode is different from the orientation acquired.

In a possible implementation, the device 4000 further includes:

a second acquisition unit 407, configured to acquire height information corresponding to the first shooting mode according to a correspondence between the shooting mode and the height information; and a first determination unit 408, configured to determine whether the height information includes two or more heights.

In a possible implementation, the device 4000 further includes:

a second determination unit 409, configured to determine whether the first shooting mode corresponds to two or more height information;

a second display unit 410, configured to display the two or more height information on the shooting interface in a determination that the first shooting mode corresponds to two or more height information; and a determination unit 411, configured to determine the first height information as height information of the first shooting mode in response to detecting a selection operation of a first height information in the two or more height information.

In a possible implementation, the control unit 403 is further configured to:

in a determination that the height information does not include two or more heights, move the first camera to a third height, where the third height is a height of a camera set in the height information;

shoot images under different exposure parameters at the third height to obtain at least two images; and perform fusion processing on the at least two images obtained to obtain the shot photo.

In a possible implementation, the device 4000 further includes:

a third display unit 412, configured to display an adjustable range in response to detecting an adjustment instruction for adjusting a height of the first camera; and an adjustment unit 413, configured to adjust the first camera to a height corresponding to the operation in response to detecting an operation for the adjustable range.

In a possible implementation, the device 4000 further includes:

a second output unit 414, configured to promote information for prompting whether to confirm the operation for the adjustable range; and a detection unit 415, configured to detect an operation for confirmation of the operation for the adjustable range input for the information.

In a possible implementation, the device 4000 further includes:

a fourth display unit 416, configured to display an adjustable range in response to detecting an adjustment instruction for adjusting a height of the first camera; and a fifth display unit 417, configured to display a height of the first camera being dragged within the adjustable range in response to detecting dragging of the first camera.

In a possible implementation, the device 4000 further includes:

a third output unit 418, configured to promote information for prompting the terminal device cannot be moved during shooting by the first camera.

In a possible implementation, the first shooting mode is a blur shooting mode, and the method further includes: obtaining subject information and depth information from the first image and the second image; and performing fusion processing on the first image and the second image to synthesize a blurred photo.

Figure 5:
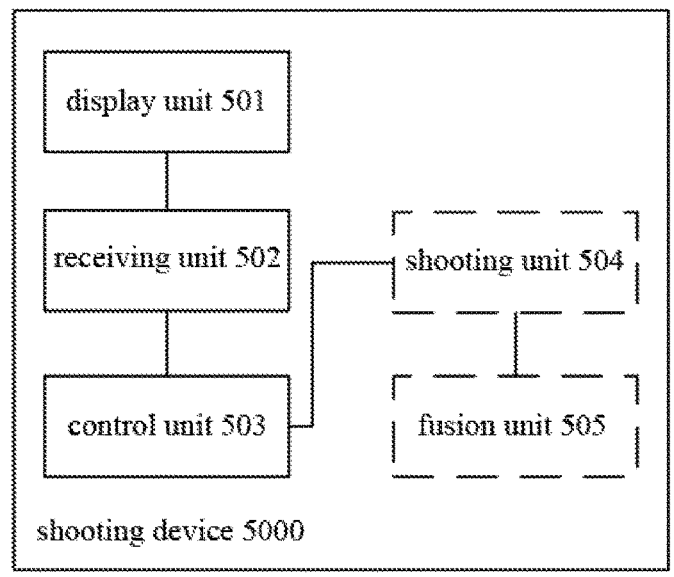
FIG. 5 is a schematic structural diagram of another shooting device according to an embodiment of this application.

Please refer to FIG. 5. FIG. 5 is a schematic flowchart of a shooting device of this application. As shown in FIG. 5, the shooting device 5000 may include:

a display unit 501, configured to display a shooting interface;

a receiving unit 502, configured to receive a shooting instruction input by a user;

a control unit 503, configured to control a second camera to shoot at different heights and a third camera to shoot at different heights to obtain a shot photo, where the second camera and the third camera are at least one lift-able camera among the at least one lift-able camera.

In a possible implementation, the device 5000 further includes:

a shooting unit 504, configured to shoot panoramic images continuously during retraction when the third camera is extended to a maximum height and then be retracted therefrom towards the terminal device;

a fusion unit 505, configured to perform fusion processing on the panoramic images shot by the third camera and an image shot by the second camera to realize a panoramic shooting function.

In a possible implementation, the device 5000 further includes:

In a possible implementation, during fusion process, the image shot by the second camera is taken as a central axis of the panoramic photo.

In a possible implementation, the control unit 503 is specifically configured to:

acquire height information corresponding to a second shooting mode according to a correspondence between a shooting mode and height information;

acquire first height information corresponding to the second camera and second height information corresponding to the third camera according to the second shooting mode; and determine whether the first height information and the second height information both include two or more heights.

In a possible implementation, the control unit 503 is further configured to:

in a determination that the first height information and the second height information both include two or more heights, control the second camera to shoot a first image at a third height, and control the third camera to shoot a second image at a fourth height;

control the second camera to shoot a third image at a fifth height, and control the third camera to shoot a fourth image at a sixth height, where the third height and the fifth height are two different heights in the first height information, and the fourth height and the sixth height are two different heights in the second height information; and perform fusion processing on the first image, the second image, the third image, and the fourth image to obtain the shot photo.

The device in the embodiments of this application is applied to a terminal device provided with at least one lift-able camera in at least one camera. A shooting instruction input by the user is received, so that at least one lift-able camera may shoot multiple images separately for fusion processing to obtain a shot photo, and depth of field information may be acquired from the multiple images, so that better shooting effects may be obtained.

Figure 6:
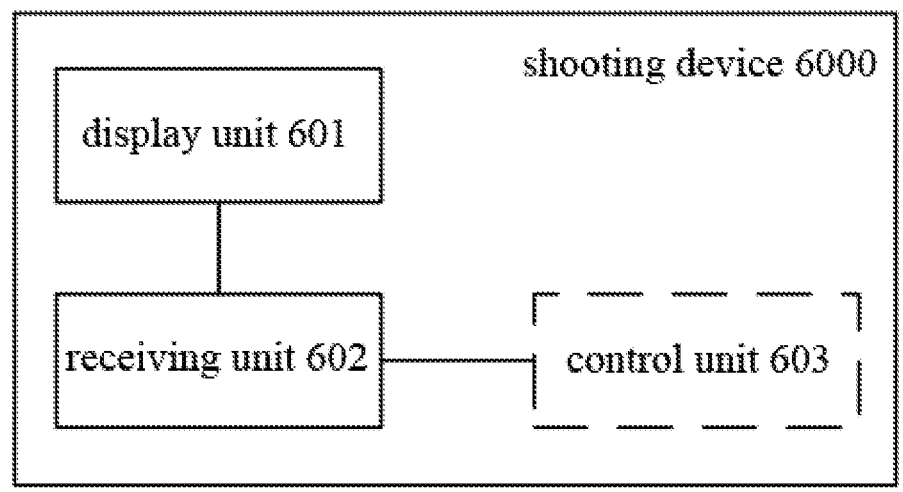
FIG. 6 is a schematic structural diagram of still another shooting device according to an embodiment of this application.

Please refer to FIG. 6. FIG. 6 is a schematic flowchart of another shooting device of this application. As shown in FIG. 6, the shooting device 6000 may include:

a display unit 601, configured to display a shooting interface;

a receiving unit 602, configured to receive a shooting instruction input by a user;

a control unit 603, configured to control the at least one lift-able camera to be extended to a maximum height and then be retracted therefrom towards the terminal device, continuously shooting panoramic images during retraction.

In a possible implementation, the terminal device further includes a fixed camera in addition to the at least one lift-able camera; and a control unit 603, configured to control the fixed camera to shoot and output a fixed image, control the at least one lift-able camera to output a panoramic image, and perform fusion processing on the fixed image and the panoramic image to obtain a panoramic photo, in response to receiving an automatic panoramic shooting instruction.

Figure 7:
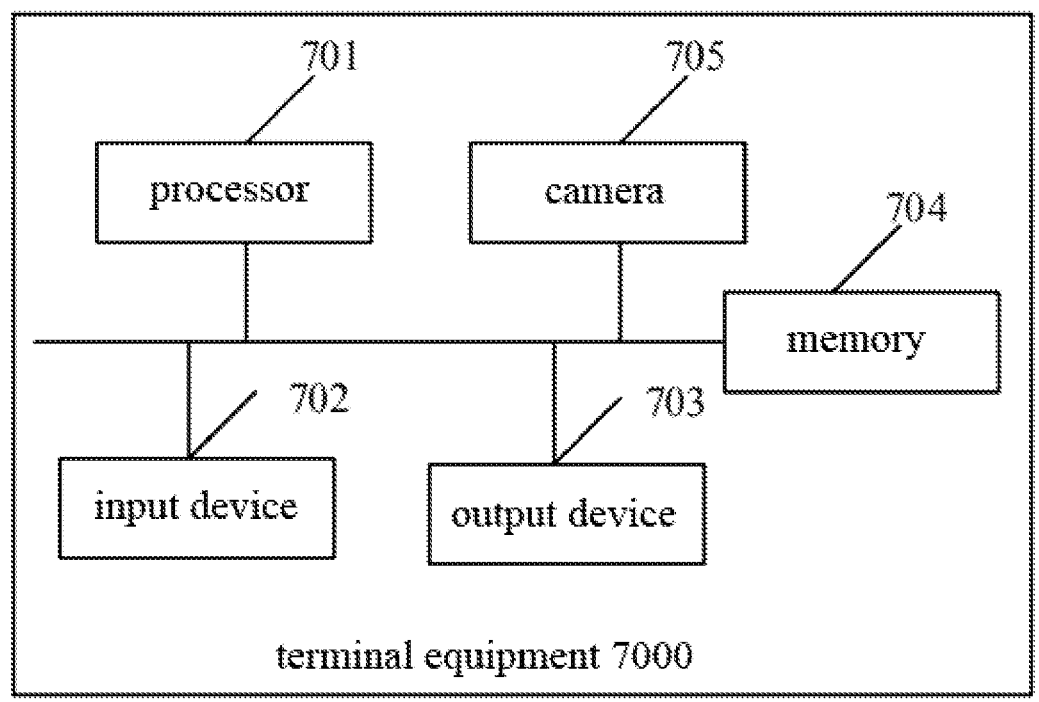
FIG. 7 is a schematic structural diagram of a terminal device according to an embodiment of this application.

Please refer to FIG. 7. FIG. 7 is a schematic structural diagram of a terminal device according to an embodiment of this application. As shown in FIG. 7, the terminal device 7000 may include:

at least one processors 701, an input device 702, an output device 703, a memory 704, and a camera 705. The aforementioned processors 701, input device 702, output device 703, memory 704, and camera 705 are connected by a bus. The input device 702 and the output device 703 are configured to receive and send data. The memory 704 is configured to store a computer program, and the computer program includes program instructions. The processor 701 is configured to execute the program instructions stored in the memory 704, where the processor 701 is configured to invoke the program instructions to perform the following steps:

controlling, by the processor 701, the output device 703 to display a shooting interface;

controlling, by the processor 701, the input device 702 to receive a shooting instruction; and controlling, by the processor 701, the camera 705 to shoot multiple images at different heights to obtain a shot photo, where the first camera is one of the at least one lift-able camera.

In a possible implementation, before controlling, by the processor 701, the input device 702 to receive a shooting instruction, the processor 701 is further invoked to perform the following steps:

in response to detecting a selection instruction for selecting a first shooting mode, switching a shooting mode from a current shooting mode to the first shooting mode.

In a possible implementation, controlling, by the processor 701, the camera 705 to shoot multiple images at different heights to obtain a shot photo includes:

controlling the first camera to shoot a first image at a first height;

controlling the first camera to shoot a second image at a second height, where the first height and the second height are two different heights in height information; and performing fusion processing on the first image and the second image to obtain the shot photo.

In a possible implementation, the height information further includes an orientation of the terminal device, and the processor 701 is further invoked to perform the following steps:

acquiring the orientation of the terminal device, where the orientation is a vertical orientation or a horizontal orientation; and controlling, by the processor 701, the output device 703 to promote information for prompting the user to adjust the orientation of the terminal device in a determination that an orientation in height information corresponding to the first shooting mode is different from the orientation acquired.

In a possible implementation, prior to controlling, by the processor 701, the first camera to shoot a first image at a first height, the following steps are further included:

acquiring height information corresponding to the first shooting mode according to a correspondence between the shooting mode and the height information; and determining whether the height information includes multiple heights.

In a possible implementation, subsequent to acquiring, by the processor 701, height information corresponding to the first shooting mode according to a correspondence between the shooting mode and the height information, the processor 701 is further invoked to perform the following steps:

determining whether the first shooting mode corresponds to two or more height information;

in a determination that the first shooting mode corresponds to two or more height information, displaying the two or more height information on the shooting interface; and in response to detecting a selection operation of a first height information in the two or more height information, determining the first height information as height information of the first shooting mode.

In a possible implementation, controlling, by the processor 701, the camera 705 to shoot multiple images at different heights to obtain a shot photo further includes:

in a determination that the height information does not include two or more heights, moving the first camera to a third height, where the third height is a height of a camera set in the height information;

shooting images under different exposure parameters at the third height to obtain at least two images; and performing fusion processing on the at least two images obtained to obtain the shot photo.

In a possible implementation, subsequent to moving, by the processor 701, the camera 705 to a third height, the processor 701 is further invoked to perform the following steps:

controlling, by the processor 701, the output device 703 to display an adjustable range in response to detecting an adjustment instruction input by the user for adjusting a height of the first camera; and in response to detecting a user operation for the adjustable range, adjusting, by the processor 701, the camera 705 to a height corresponding to the user operation.

In a possible implementation, subsequent to controlling, by the processor 701, the output device 703 to display an adjustable range, the processor 701 is further invoked to perform the following steps:

controlling, by the processor 701, the output device 703 to promote information for prompting the user whether to confirm the operation for the adjustable range; and detecting an operation for confirmation of the operation for the adjustable range input by the user for the information.

In a possible implementation, subsequent to moving, by the processor 701, the camera 705 to a third height, the method further includes:

controlling, by the processor 701, the output device 703 to display an adjustable range in response to detecting an adjustment instruction input by the user for adjusting a height of the first camera; and controlling, by the processor 701, the output device 703 to display a height of the first camera being dragged within the adjustable range in response to detecting dragging of the first camera.

In a possible implementation, the processor 401 controls the output device 403 to be invoked to perform the following steps:

during shooting by the first camera, promoting information for prompting the user that the terminal device cannot be moved.

In a possible implementation, the first shooting mode is a blur shooting mode, and the following operations are further included: obtaining subject information and depth information from the first image and the second image; and performing, by the processor 701, fusion processing on the first image and the second image to synthesize a blurred photo.

It should be understood that in some feasible implementation, the processor 701 may be a Central Processing Unit (CPU), and the processor may also be other general-purpose processors or Digital Signal Processors (DSP), Application Specific Integrated Circuit (ASIC), Field-programmable Gate Array (FPGA) or other programmable logic devices, discrete gates or transistor logic devices, discrete hardware components, etc. The general-purpose processor may be a microprocessor or the processor may also be any conventional processor or the like.

The memory 704 may include a read-only memory and a random access memory, and provides instructions and data to the processor 701. A part of the memory 704 may also include a non-volatile random access memory. For example, the memory 704 may also store device type information.

The input device 702 may include a touch screen, and the output device 703 may include a speaker and a screen with a display function. The camera 705 may be a lift-able camera.

In specific implementation, the terminal device may execute the implementation provided in each step in FIG. 1 through its built-in functional modules. For details, refer to the implementation provided in the aforementioned steps, and details are not described herein again.

Regarding the terminal device in the embodiments of this application, a shooting interface is displayed and a shooting instruction input by the user is received, so that the at least one lift-able camera may shoot multiple images at different heights. The terminal device processes the obtained multiple images, takes the processed result as a shot photo, and outputs the shot photo. The method of controlling the lift-able camera to replace shooting by multiple cameras may not only reduce the occupation of the interface from the hardware, but also simplify the circuit structure of the terminal device, thereby reducing the debugging time on the software and improving the shooting efficiency.

Figure 8:
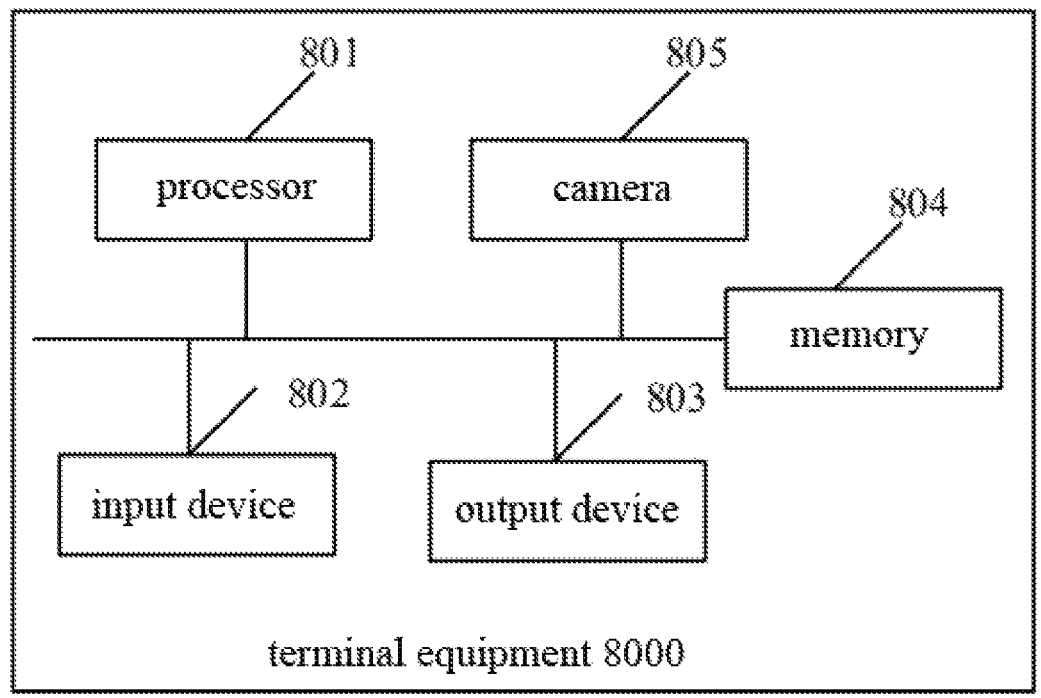
FIG. 8 is a schematic structural diagram of another terminal device according to an embodiment of this application.

Please refer to FIG. 8. FIG. 8 is a schematic structural diagram of another terminal device according to an embodiment of this application. As shown in FIG. 8, the terminal device 8000 may include:

at least one processors 801, an input device 802, an output device 803, a memory 804, and a camera 805. The aforementioned processors 801, input device 802, output device 803, memory 804, and camera 805 are connected by a bus.

The input device 802 and the output device 803 are configured to receive and send data. The memory 804 is configured to store a computer program, and the computer program includes program instructions. The processor 801 is configured to execute the program instructions stored in the memory 804, where the processor 801 is configured to invoke the program instructions to perform the following steps:

controlling, by the processor 801, the output device 803 to display a shooting interface;

controlling, by the processor 801, the input device 802 to receive a shooting instruction input by a user; and controlling, by the processor 801, the camera 805 to shoot at different heights and the third camera to shoot at different heights to obtain a shot photo, where the second camera and the third camera are at least one lift-able camera among the at least one lift-able camera.

In a possible implementation, the second camera is a fixed camera, and the third camera is the lift-able camera, subsequent to receiving the shooting instruction;

controlling, by the processor 801, the third camera to be extended to a maximum height, then be retracted therefrom towards the terminal device, and continuously shoot panoramic images during retraction; and performing fusion processing on the panoramic images shot by the third camera and an image shot by the second camera to realize a panoramic shooting function.

In a possible implementation, during fusion of a photo, taking, by the processor 801, the image shot by the second camera as a central axis of the panoramic photo.

In a possible implementation, controlling, by the processor 801, a second camera to shoot at different heights and a third camera to shoot at different heights to obtain a shot photo includes:

acquiring height information corresponding to a second shooting mode according to a correspondence between a shooting mode and height information, where the second shooting mode is a shooting mode selected by the user;

acquiring first height information corresponding to the second camera and second height information corresponding to the third camera according to the second shooting mode; and determining whether the first height information and the second height information both include multiple heights.

In a possible implementation, in a determination that the first height information and the second height information both include multiple heights, the method further includes: controlling the second camera to shoot a first image at a third height, and controlling the third camera to shoot a second image at a fourth height;

controlling the second camera to shoot a third image at a fifth height, and controlling the third camera to shoot a fourth image at a sixth height, where the third height and the fifth height are two different heights in the first height information, and the fourth height and the sixth height are two different heights in the second height information; and performing fusion processing on the first image, the second image, the third image, and the fourth image to obtain the shot photo.

The terminal device in the embodiments of this application is applied to a terminal device provided with at least one lift-able camera in at least one camera, by receiving a shooting instruction input by the user, at least one lift-able camera may shoot multiple images separately for fusion processing to obtain a shot photo, and depth of field information may be acquired from the multiple images, so that better shooting effects may be obtained.

Figure 9:
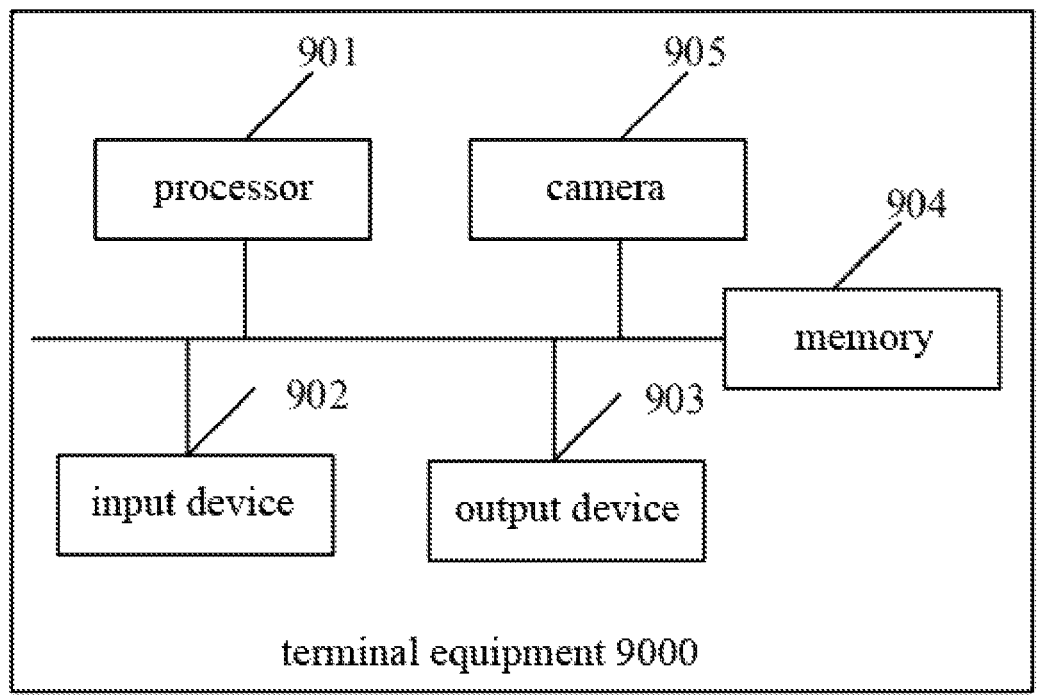
FIG. 9 is a schematic structural diagram of still another terminal device according to an embodiment of this application.

Please refer to FIG. 9. FIG. 9 is a schematic structural diagram of still another terminal device according to an embodiment of this application. As shown in FIG. 9, the terminal device 9000 may include:

at least one processors 901, an input device 902, an output device 903, a memory 904, and a camera 905. The aforementioned processors 901, input device 902, output device 903, memory 904, and camera 905 are connected by a bus. The input device 902 and the output device 903 are configured to receive and send data. The memory 904 is configured to store a computer program, and the computer program includes program instructions. The processor 901 is configured to execute the program instructions stored in the memory 904, where the processor 901 is configured to invoke the program instructions to perform the following steps:

displaying a shooting interface;

controlling, by the processor 901, the input device 902 to receive a shooting instruction; and controlling, by the processor 901, the at least one lift-able camera to be extended to a maximum height, then be retracted therefrom towards the terminal device, and continuously shoot panoramic images during retraction.

In a possible implementation, the terminal device includes a fixed camera in addition to the lift-able camera. In response to receiving, by the processor 901, an automatic panoramic shooting instruction, controlling the fixed camera to shoot and output a fixed image, controlling the at least one lift-able camera to output the panoramic images, and performing fusion processing on the fixed image and the panoramic images to obtain a panoramic photo.

The terminal device in the embodiments of this application is applied to a terminal device provided with at least one lift-able camera in at least one camera, a shooting instruction input by the user is received, so that at least one lift-able camera may shoot multiple images separately for fusion processing to obtain a shot photo, and depth of field information may be acquired from the multiple images, so that better shooting effects may be obtained.

The foregoing computer-readable storage medium may be the task processing device provided in any of the aforementioned embodiments or the internal storage unit of the aforementioned information processing device, such as the hard disk or memory of the information processing device. The computer-readable storage medium may also be an external storage device of the information processing device, such as a plug-in hard disk, Smart Media Card (SMC), Secure Digital (SD) card, flash card, etc. equipped on the information processing device. The computer-readable storage medium may also include a magnetic disk, an optical disk, a Read Only Memory (ROM), or a Random Access Memory (RAM), etc. Further, the computer-readable storage medium may further include both an internal storage unit and an external storage device of the information processing device. The computer-readable storage medium is configured to store the computer programs and other programs and data required by the information processing device. The computer-readable storage medium may further configured to temporarily store data that has been output or will be output.

The terms "first" and "second" in the claims, specification and drawings of this application are used to distinguish different objects, rather than to describe a specific sequence. In addition, the terms "include" and "have" and any variations thereof are intended to cover non-exclusive inclusion. For example, a process, method, system, product, or device that includes a series of steps or units is not limited to the listed steps or units, but optionally includes unlisted steps or units, or optionally further includes other steps or units inherent to these processes, methods, products or equipment. Reference to "embodiments" herein means that a specific feature, structure, or characteristic described in conjunction with the embodiments may be included in at least one embodiment of this application. The display of the phrase in various positions in the specification does not necessarily refer to the same embodiment, nor is it an independent or alternative embodiment mutually exclusive with other embodiments. Those skilled in the art clearly and implicitly understand that the embodiments described herein can be combined with other embodiments. The term "and/or" used in the specification and appended claims of this application refers to any combination of at least one of the items listed in the associated and all possible combinations, and includes these combinations.

A person of ordinary skill in the art may be aware that the units and algorithm steps of the examples described in the embodiments disclosed herein can be implemented by electronic hardware, computer software, or a combination of the two. In order to clearly illustrate the interchangeability of the hardware and software, in the above description, the composition and steps of each example have been generally described in accordance with the function. Professionals and technicians can use different methods for each specific application to implement the described functions, but such implementation should not be considered beyond the scope of this application.

The above-disclosed are only the preferred embodiments of the application, which of course cannot be used to limit the scope of claims of the application. Therefore, equivalent changes made according to the claims of the application still fall within the scope of the application.

The embodiments of this application are applied to a terminal device provided with at least one lift-able camera in at least one camera. A shooting interface is displayed and a shooting instruction is received, so that the at least one lift-able camera may shoot multiple images at different heights. The terminal device processes the obtained multiple images, takes the processed result as a shot photo, and outputs the shot photo. The method of controlling the lift-able camera to replace shooting by multiple cameras may not only reduce the occupation of the interface from the hardware, but also simplify the circuit structure of the terminal device, thereby reducing the debugging time on the software and improving the shooting efficiency.

What is claimed is:

1. A shooting method, applied to a mobile terminal provided with at least one camera, the at least one camera comprising at least one lift-able camera, wherein the method comprises:

displaying a shooting interface on the mobile terminal;

receiving a shooting instruction; and controlling the at least one lift-able camera to extend to a maximum height and then be retracted therefrom towards the mobile terminal, continuously shooting images during retraction;

wherein the mobile terminal further comprises a fixed camera in addition to the at least one lift-able camera; and the method further comprises:

in response to receiving a shooting instruction, controlling the fixed camera to shoot and output a fixed image, controlling the at least one lift-able camera to output an image, and performing fusion processing on the fixed image and the image to obtain a shot photo.

* * * * *